US006925207B1

(12) United States Patent
Sezan et al.

(10) Patent No.: US 6,925,207 B1
(45) Date of Patent: Aug. 2, 2005

(54) METHOD FOR FAST RETURN OF ABSTRACTED IMAGES FROM A DIGITAL IMAGES DATABASE

(75) Inventors: Muhammed Ibrahim Sezan, Camas, WA (US); Richard Junqiang Qian, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/535,436

(22) Filed: Mar. 23, 2000

Related U.S. Application Data

(63) Continuation of application No. 09/085,388, filed on May 27, 1998.
(60) Provisional application No. 60/049,586, filed on Jun. 13, 1997.

(51) Int. Cl.[7] ................................................. G06K 9/62
(52) U.S. Cl. ........................... 382/209; 382/243; 707/3
(58) Field of Search ................................ 382/209, 243, 382/201, 202, 203, 204, 192, 224, 198, 214, 216, 218, 240, 226, 298, 227; 707/104.1, 3, 4, 5, 6

(56) References Cited

U.S. PATENT DOCUMENTS

| 4,748,675 A | | 5/1988 | Suzuki et al. | |
|---|---|---|---|---|
| 4,771,474 A | | 9/1988 | Takashima et al. | |
| 4,975,969 A | | 12/1990 | Tal | |
| 4,991,223 A | | 2/1991 | Bradley | |
| 5,267,332 A | * | 11/1993 | Walch et al. | ............... 382/198 |
| 5,465,308 A | | 11/1995 | Hutcheson et al. | |
| 5,521,841 A | | 5/1996 | Arman et al. | |
| 5,579,471 A | | 11/1996 | Barber et al. | |
| 5,734,893 A | * | 3/1998 | Li et al. | ..................... 382/203 |
| 5,802,361 A | | 9/1998 | Wang et al. | |
| 5,867,597 A | * | 2/1999 | Peairs et al. | ................ 382/209 |
| 5,915,038 A | * | 6/1999 | Abdel-Mottaleb et al. | ... 358/1.9 |
| 6,124,864 A | | 9/2000 | Madden et al. | |

FOREIGN PATENT DOCUMENTS

| EP | 0 152 355 A2 | 8/1985 |
|---|---|---|
| EP | 0 806 733 A2 | 11/1997 |
| EP | 0 806 733 A3 | 12/1998 |
| HK | XP-002082314 | 6/1997 |
| WO | WO 92/05655 | 4/1992 |

OTHER PUBLICATIONS

ISO/IEC JTC1/SC29/WG11 M1187, "Vertex–Based Hierarchical Shape Representation and Coding," Sep. 24, 1996.
ISO/IEC JTC1/SC29/WG11 M1402, "Scalable Vertex–Based Shape Coding," Nov. 11, 1996.
ISO/IEC JTC1/SC29WG11 M1905, "Methods for Vertex–Based Scalable Shape Coding," Mar. 31, 1997.
Fischler, Martin, "Perceptual Organization and Curve Partitioning," IEEE Transactions on Pattern Analysis and Machine Intelligence, Jan. 1986, vol. PAMI–8, No. 1, pp. 100–105.

* cited by examiner

*Primary Examiner*—Bhavesh M. Mehta
*Assistant Examiner*—Ali Bayat
(74) *Attorney, Agent, or Firm*—Chernoff Vilhauer McClung & Stenzel, LLP

(57) ABSTRACT

A method for expediting a search of a digital image database comprises, for each digital image, constructing a set of at least two abstracted images varying in level of detail and searching the abstracted images. Selected ones of the abstracted images are down-loaded to a user thereby reducing download time through a finite bandwidth communicative medium relative to the time needed to download complete digital images.

2 Claims, 5 Drawing Sheets

METHOD FOR FAST RETURN OF ABSTRACTED IMAGES FROM A DIGITAL IMAGES DATABASE

This is a continuation of application Ser. No. 09/085,388 filed May 27, 1998.

The present application is a continuation-in-part of U.S. Provisional Patent Application Ser. No. 60/049,586, filed on Jun. 13, 1997 which is assigned to the assignee of the present application and is incorporated by reference as if fully set forth in its entirety herein.

BACKGROUND OF THE INVENTION

The present invention relates to a system for searching a digital image database to identify a set of images that bear a similarity to a first digital image of interest and for permitting a user at a remote terminal connected to a main computer by way of a limited bandwidth communicative link to efficiently obtain representations of the identified images.

With the advent of widespread computer technology and the formation of large databases of digital imagery, the ability to search through a database to find images of interest is becoming increasingly important. A number of approaches have been taken to address this problem.

Tal, U.S. Pat. No. 4,975,969, discloses a system for identifying peoples' faces. The system works by forming a ratio between two facial parameters, such as the distance between eyes and the tip of the nose and the distance between the tip of the nose and the bottom of the upper lip. This system is narrowly drawn toward the recognition of unique facial features and does not shed much light on the problem of finding particular digital images of interest from a more generalized database of digital images that includes many images that are not human faces.

Bradley, U.S. Pat. No. 4,991,223, discloses a system for recognizing image features using color elements. The image is scanned and each color in the image is represented by a code. Then the scanned and coded image is processed by a correlator which detects color discontinuities and thereby identifies differently colored features. This system is designed for use in inspection systems, in which a great deal of prior information is available and is not applicable to digital image database search systems, in which a great deal of search query formation flexibility is required.

Agrawal et al., U.S. Pat. No. 5,647,058, discloses a method for high-dimensionally indexing in a multi-media database. In this method a series of vectors are extracted from the objects in a database and used in a similarity search with a target object. A secondary search is performed to eliminate false positives.

Arman et al., U.S. Pat. No. 5,521,841, disclose a system for browsing the contents of a given video sequence. Representative frames are chosen from the video sequence. Each representative frame is abstracted into a group of 16×16 pixel blocks and compared with a similarly abstracted representation of a frame for which the user is attempting to find a match. Representative frames with a degree of similarity above a threshold are presented to the user for further inspection.

Barber et al., U.S. Pat. No. 5,579,471, disclose a method for searching an image databased on a query that is compiled by a human user by selecting image characteristics, such as color, from a display on a screen and for example, indicating where in the sought after image the color should occur. Using the user compiled query the computer system searches through the database and returns images which fall within some threshold of nearness to the query. No system is described by Barber et al. for abstracting complex shapes. This patent does, however, reference G. Taubin and D. B. Cooper "Recognition and Positioning of Rigid Objects Using Algebraic Moment Invariants," Geometric Methods in Computer Vision, SPIE Vol. 1570, pp 175–186, 1992. Barber et al., also disclose providing a set of images determined to be similar to the search image. There is, however, in this patent no preabstraction of the digital image database nor shape abstraction based on point saliency.

Coincidentally, with the development of object based programming, scenes may be digitally represented as a set of data objects. For example, a scene with a horse-drawn carriage crossing a bridge may be divided into a data object representing the carriage, another data object representing the horse pulling the carriage, and yet another data object representing the static imagery in the scene. This technique of scene representation increases the importance of shape recognition for searching through an image database, because a data object representation may have a distinctive, and therefore recognizable, shape.

One problem encountered by those linked to an image database by means of a standard telephone line or other narrow bandwidth link is the slow download time for detailed images. This may present a problem in searching through the digital image database because if, for example, a search of an image database returns 10 images and each image requires 3 minutes to download to the user's image display apparatus, it will take the user 30 minutes to download all of the images in order to find an image of interest. This could prove frustrating, because it is possible that many of the images could have been eliminated quickly if not for the lengthy download time.

Therefore, an efficient way to search a digital image database for the presence of a particular shape and to efficiently return a preliminary set of search results to the user is needed but not yet available.

SUMMARY OF THE INVENTION

The present invention is a method for expediting a search of a candidate digital image database, comprising constructing a hierarchy of reduced detail image abstraction layers ranked by level of detail. A search is then conducted of the image abstractions and a set of reduced detail image abstractions is returned to the user, thereby reducing download time through a finite bandwidth communicative link. The user may peruse these images, which may be reduced in size to allow many to fit on the user's display screen at once, in order to find an image or images of interest. The image corresponding to a downloaded abstraction may be selected for delivery in its entirety or at some other higher level of detail.

In a separate aspect of the present invention, a method for searching a digital image database includes the initial step of identifying a target point set representing a digital image outline from the target image. Then a target most salient point set is identified from the target point set. A target point set representing a digital image outline from a user supplied target image is identified. Then, a target most salient point set from the target point set is found. Finally, the target most salient point set is compared to the candidate most salient point set and the candidate image is noted for further inspection if the target most salient point set meets a threshold of similarity with the candidate most salient point set.

In a separate aspect, the present invention comprises a search method for finding a match for a target digital image in a set of candidate images, comprising for each candidate image, forming a hierarchy of abstractions ranked by amount of data needed to represent each abstraction, from a least detailed candidate image abstraction to a most detailed candidate image abstraction and forming a target least detailed image abstraction from said target digital image. Then, comparing target least detailed image abstraction to each candidate least data intensive target image abstraction to form a first subset of candidate images. Next, iteratively comparing the target digital image to each said nth detailed abstraction of the (n−1)th subset of candidate images to form an nth subset of candidate images until a completion test is satisfied, resulting in the selection of a final candidate image set and returning said final candidate images.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
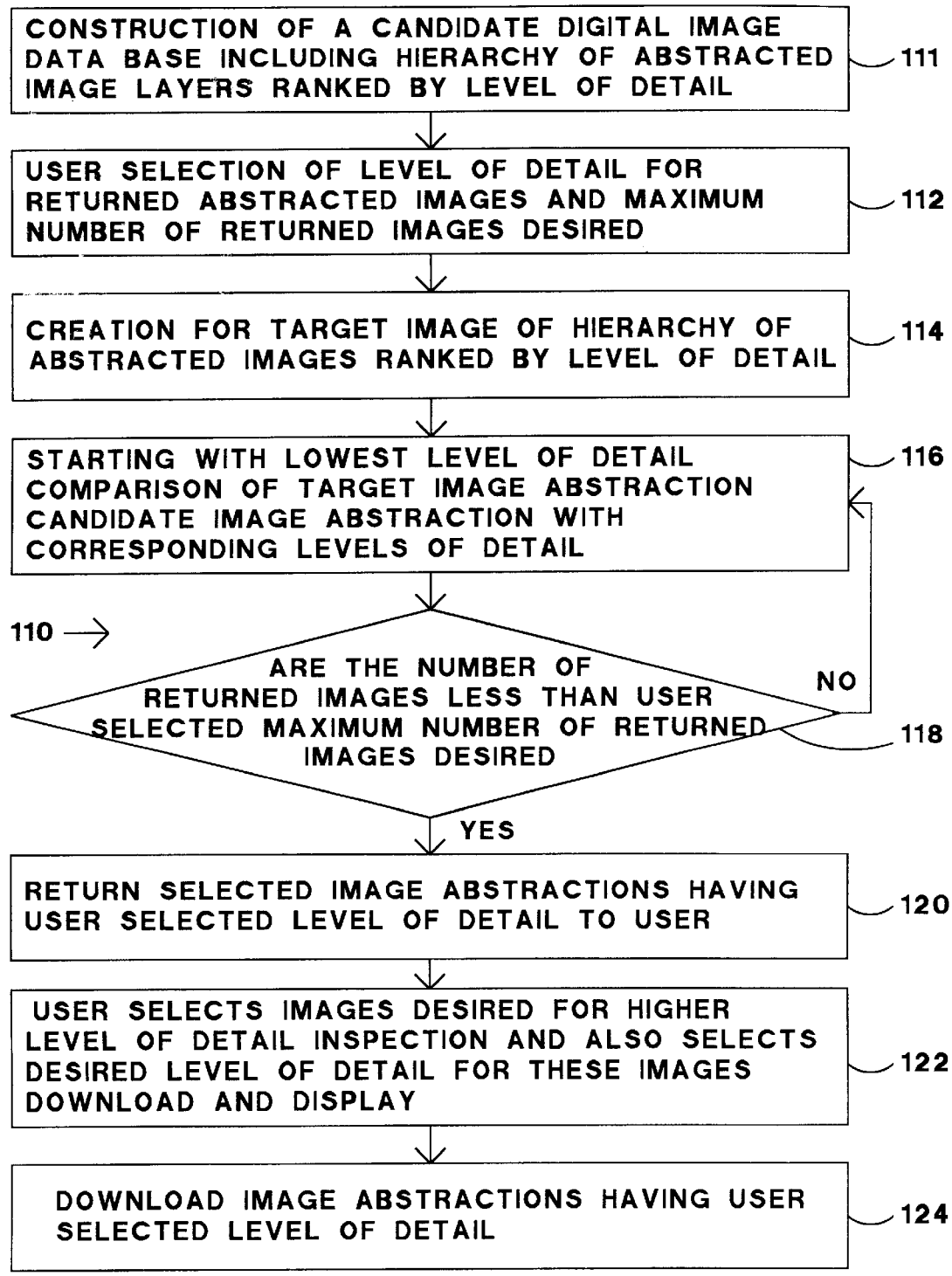
FIG. 1 is a flow chart for practicing an exemplary method of the present invention.
Figure 2:
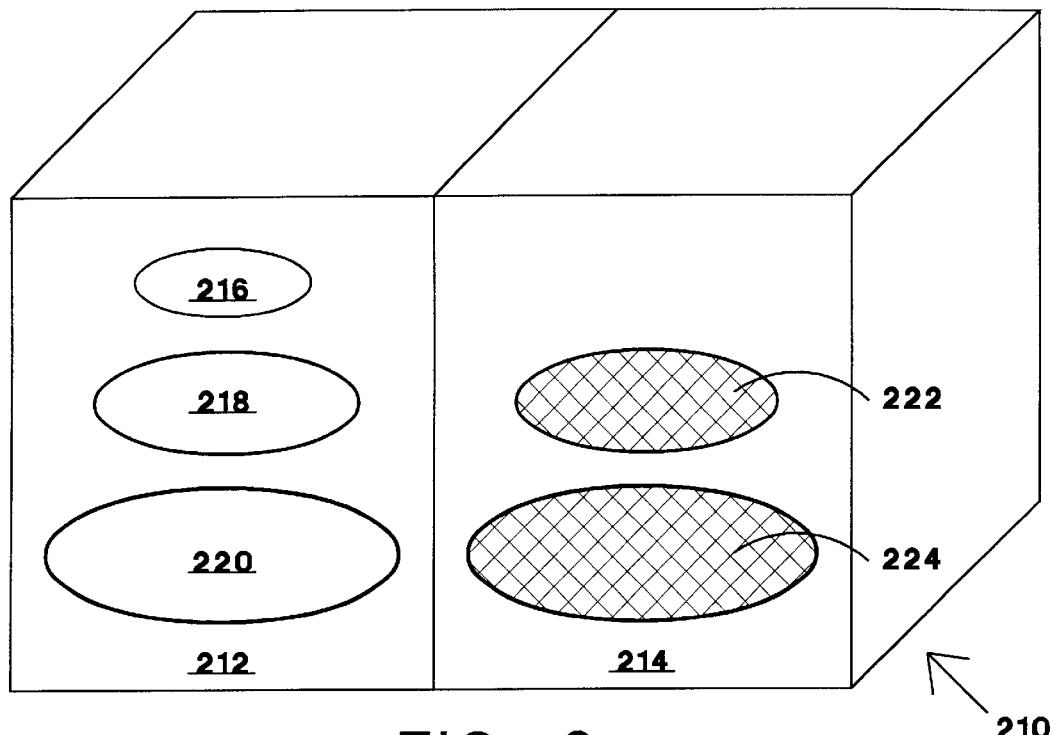
FIG. 2. is an illustration of a digital image object library containing hierarchical representations (coded or not coded) of shape and texture and objects.

FIG. 1 is a flow chart of an exemplary method 110 of practicing the present invention. The method begins (block 111) with the construction of a database of digital images, each one having a corresponding set of abstracted outline layers, such as the set shown in FIG. 4. As illustrated in FIG. 2, in one embodiment, one type of abstraction may be stored as a set of digital images 210. A hierarchy of shape abstractions 212 and a hierarchy of texture abstractions 214 are stored for each image. Texture abstractions 214 may be produced in a number of different ways, for example storing only the contrast lines inside an image. Another method of shape abstraction, namely vertex-based representation, is described in detail in subsequent paragraphs. Three layers of shape abstractions 216, 218 and 220 are stored, whereas only two layers of texture abstractions 222 and 224 are stored. In general, different numbers of layers of different types of abstractions may be stored in the digital image set storage memory. Each layer could include a distinctiveness index to guide the order of comparisons.

In the next step (block 112), a human user selects the maximum number of images he would like to have returned to him as a result of the search, for further inspection. Additionally, the user requests a maximum level of detail for the returned abstracted images.

Next, (block 114) the target image, that is the image for which the user would like to find a match, is abstracted. This could be done through any one of a number of different technique. Of course, the user's target image must be available or must be entered into an electronic digital format. The method taught in following paragraphs picks the salient points (i.e. vertices) from the outline of the image. An hierarchy of abstracted layers ranked by a decreasing level of detail is constructed. In the first iteration of step 116, the lowest level of detail target image abstraction is compared with the lowest level of detail layer of candidate image abstraction in order to find a subset of candidate point sets that have a first order similarity to the target point set. This process is performed iteratively with progressively higher level of detail layers of image abstractions until a set of images that is smaller than the user selected number of desired images has been identified (comparison shown in decision box 118).

Then, (block 120) the abstractions of the identified images from the user selected level of detail layer are returned to the user. In this manner the user may minimize download time while still receiving acceptably detailed images from which to make his choice. The user then selects (block 122) a subset of the returned image abstractions for return of a higher level of detail abstraction or for return of the complete unabstracted image. In block 124, the selected image abstractions are downloaded. It is possible that additional iterations could be performed, with the user selecting smaller sets of more highly detailed images, until a final image or set of images is chosen. Another method of abstracting images by taking digital spatial fourier transforms and deleting the higher frequency terms. This also would lend itself to a level of detail hierarchy of image abstractions.

Figure 3:
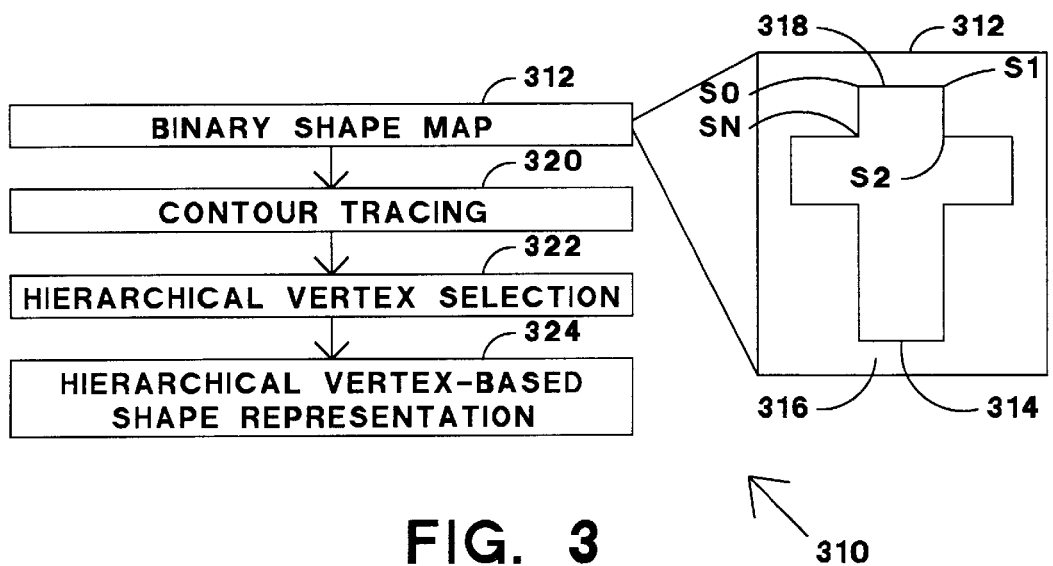
FIG. 3 is a block diagram depicting the method of the invention.

FIG. 3 depicts the major steps of determining a hierarchical vertex-based representation (i.e., abstraction), generally at 310, and an image of interest at 312. Shape may be initially represented by a binary shape map where the gray levels corresponding to the video object (VO) 314 of interest is assigned the value of "1" and the remainder 316 of the video image is set to "O." A boundary 318 is established between object 314 and remainder 316. A contour tracing step 320 determines the coordinates of all the pixels, or contour points, that are on boundary 318 of the object of interest 314. Representative vertices, $S_0, S_1, S_2 \ldots S_n$, are selected from this set of contour points. The next two steps, hierarchical vertex selection 322 and hierarchical vertex-based shape representation 324 are described in detail later herein.

The hierarchy, as used herein, is defined in terms of "visual saliency," i.e., significance of a set of vertex points in representing the contour of a video object. At the base hierarchy layer, layer "0," the most salient vertex points are determined, which vertex points capture the most salient features of the shape of the object of interest. At subsequent layers, points of lesser saliency are determined. The set of all vertex points determined at all layers form a hierarchical representation of the contour of the video object in question. Vertex points belonging to different layers reflect different visual saliency. The vertices belonging to the base layer may be used to represent the contour with the least possible number of vertices that are salient. Vertices of subsequent layers may be incrementally added to obtain a representation with increased accuracy.

Figure 4:
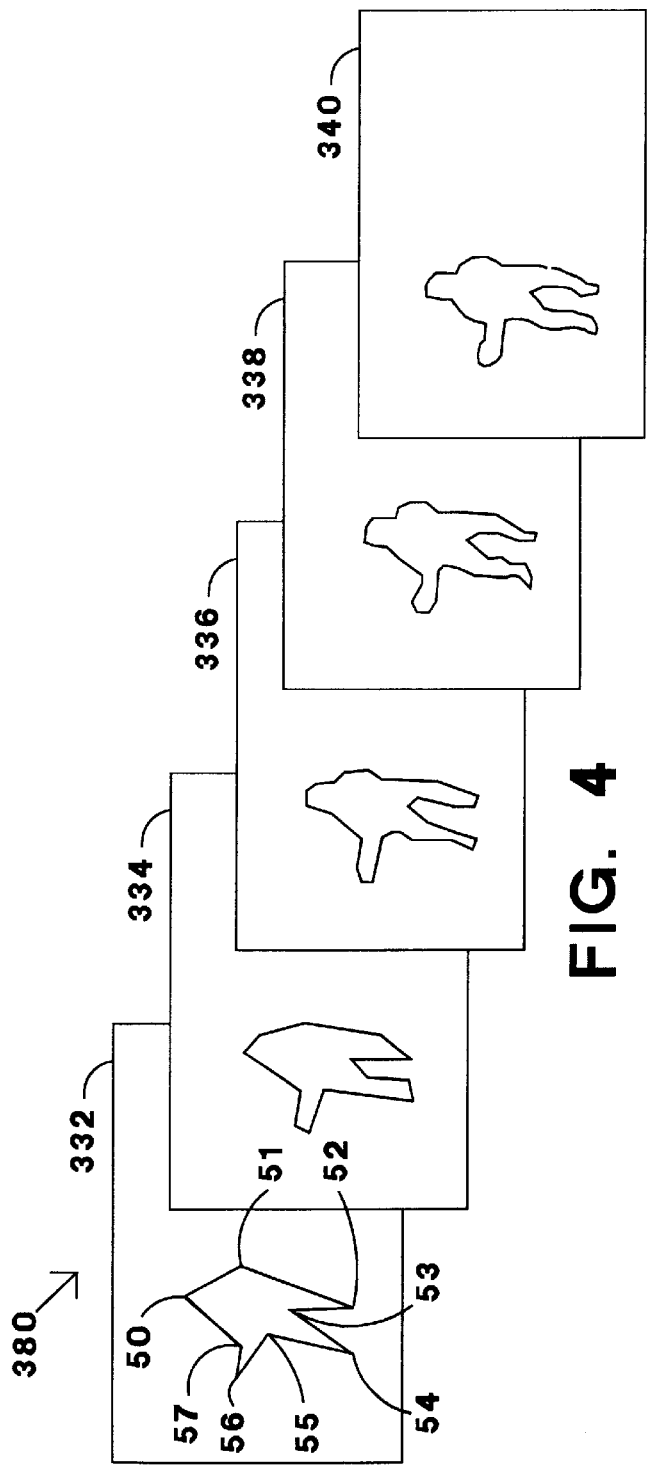
FIG. 4 is a schematic representation of the hierarchical layers used in the invention.

Hierarchical representation is created by selecting multiple set of vertices where each set constitutes a layer in the hierarchical representation, which is referred to herein as hierarchical vertex selection 322. Representation by larger number of vertices is obtained by combining the vertices from the higher levels. FIG: 4 depicts a five-layer representation of an example shape, shown generally at 330. The base layer (Layer 0) 332 has eight vertices ($S_00$–$S_70$) which capture the most salient feature of the shape 333. The next most salient layer, Layer 1 (334), has four vertices ($S_01$–$S_31$). The representations in the drawing depict the layers combined in a reconstructed condition, so that the effect of adding more vertices is seen as the shape gains definition. Layer 2 (336) and layer 3 (338) have their own sets of vertices which add additional features to the shape, and so on, until the relatively smooth representation of Layer 4 (340) may be seen to depict the outline of a tennis player. The vertices in any designated layer comprise a set of vertices, i.e., Layer 0 has a collection of vertices in Set 1; Layer 2 has a collection of vertices in Set 2, and so on. As depicted in FIG. 4, each layer is shown with the vertices from that layer's set as well as the vertices from the layer sets of more salient layers.

Figure 5:
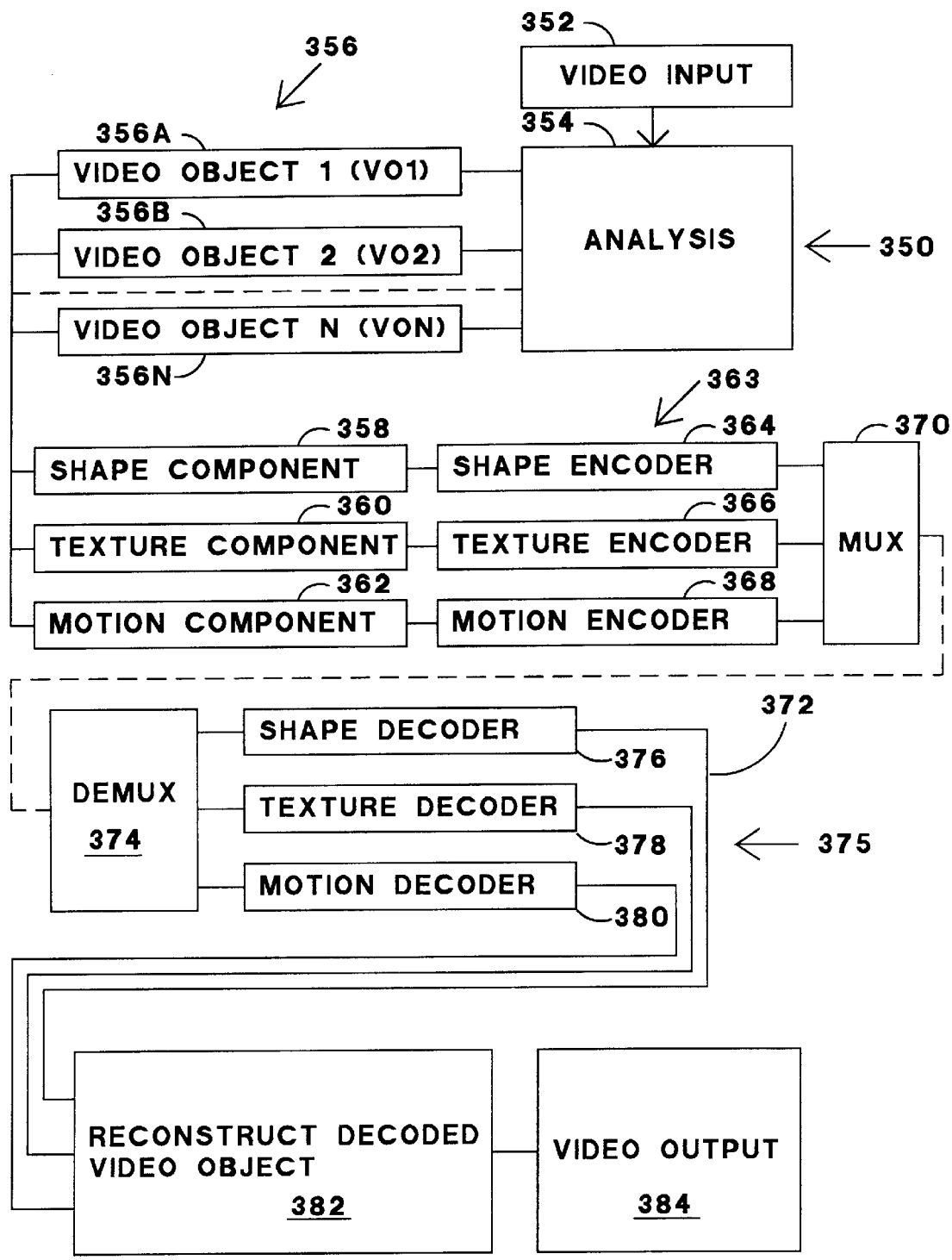
FIG. 5 is a block diagram of an apparatus for practicing a portion of the invention.

Shape representation is used in object-based image and video compression where image or video objects are coded separately from other objects. The apparatus of the invention 350 is shown in FIG. 5. Video input 352 is analyzed, block 354, into video objects (VO) 356, such as VO1 (356a), VO2 (356b) . . . VOn (356n). Each VO is defined by its shape component 358, its texture component 360, and its motion component 362. An encoder mechanism 363 includes a shape encoder 364, which encodes a particular representation of the shape, e.g., a vertex-based representation. A texture encoder 366 encodes a representation of the color or texture of the VO while a motion encoder 368 encodes a representation of the motion of the VO. In a bitstream generated by a shape encoder, the vertices belonging to different hierarchical layers are included into a single bitstream, and are encoded together. Alternately, the vertices in each layer may be included in discrete bitstreams, wherein each hierarchical layer is separately encoded. In the case where different sets corresponding to different hierarchical layers are placed in discrete bitstreams, a set of vertices of a selected layer may be predictively coded using vertices from a coarser layer.

Signals representative of the encoded shape, texture and motion are transmitted to a multiplexer 370, retransmitted through a transmission mechanism 372 of an appropriate type to a demultiplexer 374, and then to a decoder 375. Decoder 375 includes a specific shape decoder 376, a texture decoder 378, and a motion decoder 380. The VOs are reformed into a video image by a reconstruction mechanism 382, and output as a video image by video output 384. It should be appreciated that once the signals are encoded, they may be transmitted to multiplexer 370, or they may be stored in a database in place of, or in addition to, multiplexer 370 for future use, such as providing fast browsing of images in a database. The stored signals may be reconstructed into images at a later time.

The method and apparatus of the invention facilitate shape recognition and allow reconstruction of an image to varying degrees of fineness, i.e., a representation of the shape of the video object using only those contour points located in Layer 0 will result in a coarse representation when the base layer vertices are decoded and the object is reconstructed. The incorporation of vertices from less salient layers will require reconstruction using more bits, and will result in a representation of higher quality.

There are various different representations of shapes. Referring again to FIG. 3, binary shape map 312 is a possible representation by itself. Representation by the shape contour 318, and specifically by vertices on the contour ($S_0$–$S_n$), readily provides a description of the object shape and may be directly used in manipulation of the object.

A hierarchical vertex-based representation is advantageous in many applications. For instance, it facilitates fast browsing through content based image and video databases. The image objects may be reconstructed with their shapes represented with the least number of vertices that are on the other hand most salient. The user may quickly decide to skip to another candidate, when the most salient representation of the shape does not fit what the user is looking for. The user will then consider the next candidate or modify the query. Otherwise, the user will request a reconstruction of the object using additional layers of its shape information to make a decision to retrieve the object in its entirety.

A content-based image and video database may use shape directly as one of the features representing the image content, especially when a shape is a major discriminator among database objects. In such a case, shape may be represented using multiple layers of hierarchy. Fast browsing may be performed on the basis of shape alone, where shape may be progressively refined as needed during browsing. When it is determined that the shape belongs to the desired object(s), the shape and associated texture may be reconstructed at their highest accuracy for presenting the object to the user. In such a database, texture may or may not be represented in a hierarchical manner. In the latter case, texture representation may be associated with the highest quality version of the shape. In such a case, similarity measures, matching criteria can also be executed in a hierarchical manner. For instance, a matching score may be first calculated using the most salient vertices. Further consideration can be based on whether there is a match at this lower level.

The hierarchical vertex representation facilitates scalable shape coding. A shape coding method is described later herein that is intended for use with the emerging MPEG4 audiovisual coding standard. A video object may be made scalable by using the proposed hierarchical contour representation. The bit stream for a video object is quality-scalable in the sense that a decoder, such as decoder 375, may decode the vertices layer by layer, starting from the highest layer. The decoder stops decoding when the desired accuracy for contour rendering is reached. The bit stream is also spatially scalable in the sense that a decoder may decode the vertices layer by layer and use them to reconstruct the encoded shape at different spatial resolutions. The decoder may choose to reconstruct the shape at a low spatial resolution. It can do so by decoding only the base layer of vertices. It can then quantitize the coordinates of the decoded vertices and place the vertices to their nearest nodes on the low resolution grids. When a higher spatial resolution is needed, the decoder can adjust the quantitizer accordingly and may also choose to decode some enhancement layers of vertices.

Hierarchical Salient Point Selection Method

The hierarchical vertex selection method 322 is based on visual saliency, and is a hierarchical extension of the method set forth by Fischer and Bolles: *Perceptual Organization and Curve Partitioning*, IEEE Trans. Patt. Anal. Machine Intell., Vol. 8, No. 1, pp. 100–105, 1986. The method, however, is capable of more accurate contour representation.

The point selection method permits hierarchical extraction of salient points. Each hierarchy layer corresponds to a predefined saliency. The method allows users to specify the total number of layers of vertices to be extracted and the saliency of vertices at each individual layer. The saliency of vertices is determined by a parameter called $D_{max}$, which is a distance measure between a contour point and its nearby chord of the contour, as will be described below.

The shape coding algorithm first extracts salient points at the base layer corresponding to the greatest saliency. Then it recursively extracts salient points in the next layers until the least salient layer is reached. The details of the hierarchical method are described below.

Figure 6:
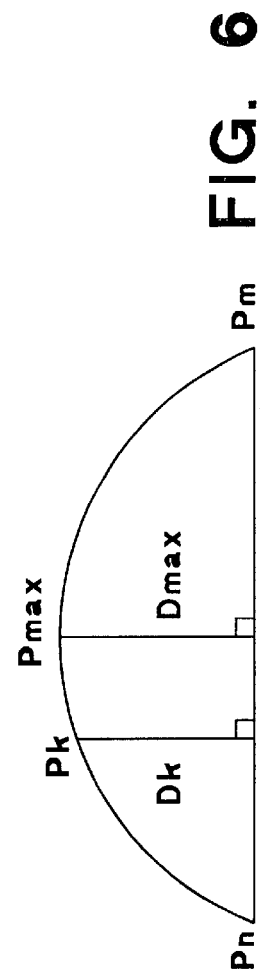
FIG. 6 is a depiction of a step in the hierarchical vertex selection method.

Referring to FIG. 6, assume that the points on a contour are ordered as $P_0, P_1, \ldots P_{N-1}$. The extracted salient points will be called $S_0[j], S_1[j], \ldots, S_{M(j)-1}[j]$, where j denotes the jth layer.

There are Three Major Steps in the Method:

Step 1: Initialization.
  (1a) Select the total number of layers: L.
  (1b) Select the saliency parameter (a predetermined saliency parameter) for each layer, record each predetermined saliency parameter in an array called $D_{max}[L]$.

Step 2: Extract salient points in layer 0 (the most salient layer).
  (2a) Start from any point, i.e., $P_n$. Form a straight line between $P_n$ and $P_m = P_{n+2}$. Compute the distance $d_k$ between each contour point $P_k$, where n<k<m, and the straight line. (See FIG. 4) Choose the largest distance $d_{max}$ from $d_k$, where n<k<m. If $d_{max} \geq D_{max}[0]$, record $P_{max}$ as a salient point at layer 0, i.e., $S_0[0]$, then go to step (2b). If $d_{max} < D_{max}[0]$, move $P_m$ to its next contour point, i.e., $P_m = P_{m+1}$ and repeat the above process until a salient point is found.
  (2b) Use $S_0[0]$ as a start point as $P_n$ in step (2a) and repeat the process in step (2a) until the next salient point $S_1[0]$ is found. Then use $S_1[0]$ as a start point and repeat the process until the next salient point is found, or the process searches back to $S_0[0]$. Go to Step 3.

Step 3: Extract salient points in layer j>0.
  (3a) Within the contour segment between each pair of adjacent salient points in the previous layer, i.e., $S_i[j-1]$ and $S_{i+1}[j-1]$, repeat the salient point extraction process as in Step 2 but using $D_{max}[1]$ Record the extracted salient points as $S_0[j], S_1[j], \ldots, S_{M(j)}[j]$.
  (3b) Repeat (3a) until j=L−1. Then stop. The relationship between saliency and the value of the parameter $D_{max}$ is illustrated in FIG. 6, where it is seen that the selected vertices at layers with larger $D_{max}$ tend to capture more significant characteristics of the shape while those with smaller $D_{max}$ tend to capture more subtlety of the shape.

A modified form of the method uses an iterative refinement method for determining hierarchical vertices, and is set forth as follows:

Step 1: Initialization.
  (1a) Select the total number of layers: L.
  (1b) Select the saliency parameter (a predetermined saliency parameter) for each layer, record the predetermined saliency parameters in an array called $D_{max}[L]$.

Step 2: Extract vertices in layer 0 (the most salient layer).
  (2a) Find the pair of points on the contour that have the largest distance in between.
  If the distance is greater than $D_{max}[0]$, select the two points as vertices in Layer 0. Otherwise, stop with no vertex selected. If the two points are selected as vertices, connect them with a line segment. Along each side of the contour, find the point that has the largest perpendicular distance from the line segment. If the distance is greater than $D_{max}[0]$, select the point as a new vertex in Layer 0. This process is repeated along each resulting line segment until no contour point having a perpendicular distance greater than $D_{max}[0]$.

Step 3: Extract vertices in layer j>0.
  (3a) Repeat the vertex selection process in Step 2 but substituting $D_{max}[0]$ with $D_{max}[j]$. The selected vertices are recorded as vertices in layer j.
  (3b) Repeat (3a) until j=L−1. Then stop.

Hierarchical Shape Coding

Figure 7:
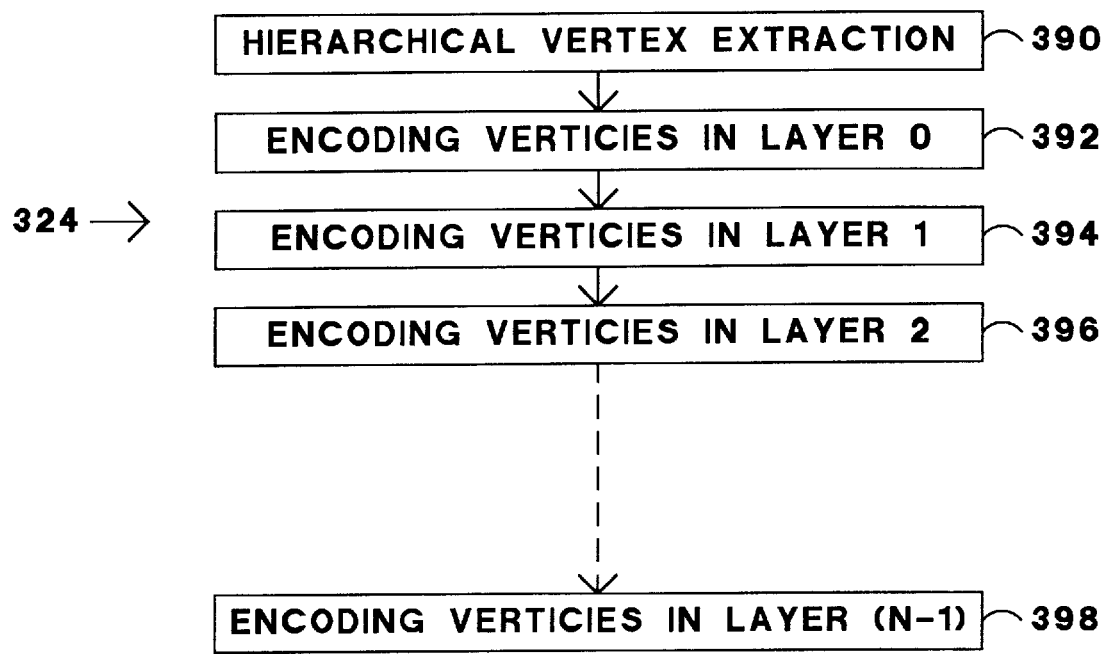
FIG. 7 is a block diagram of a hierarchical shape coding method.

Referring now to FIG. 7, a block diagram depicting hierarchical vertex representation based on salient vertex selection is presented, generally at 324. As described above, such a representation enables hierarchical shape coding. The hierarchical shape coding method is intended to be used within the framework of the emerging MPEG4 standard. The MPEG4-Standard describes a non-hierarchical vertex-based shape coding method comprising the steps of polygonal vertex selection, vertex encoding, temporal prediction by vertex list update, polygonal contour reconstruction, and reconstruction error encoding.

The shape coding method may be viewed as a hierarchical extension of the method in MPEG4-SCCE. The vertex selection method used in MPEG4-SCCE may be modified to extract vertices in a hierarchical manner, however, that method does not necessarily select visually salient vertices. By replacing the MPEG4-SCCE method with the hierarchical salient vertex selection method described herein, as shown in FIG. 3, block 322, visually salient vertices may be selected. The selected vertices are extracted into layers 390 and encoded layer-by-layer for n−1 layers, 392, 394, 396 and 398, as shown in FIG. 5, where, for example, n>3. Furthermore, vertex encoding in the instant invention is also modified accordingly to reflect a hierarchical representation. In particular, the contour is represented by a set of vertices each of which is associated with a certain hierarchy layer. Each vertex is described by its coordinates and its layer number.

Syntax

The scalable shape coding method requires an extension of the vertex-based MPEG4-SCCE syntax. The extended syntax is given in Tables 1–2, as follows:

TABLE 1

| shape_coding( ) syntax | | |
|---|---|---|
| shape_coding( ) { | | |
|   if (video_object_layer_shape != '00' { | | |
|     shape_saac_on | 1 | bslbf |
|     if (shape_saac _on == '1') | 1 | bslbf |
|   reconstruct_shape_error | | |
|     hierarchical_vertex_representation | 1 | bslbf |
|     if (VOP_prediction_type == '00' | | |
| intra_shape_coding( ) | | |
|     else if (VOP_prediction_type == '01') | | |
| inter_shape_coding( ) | | |
|     else if (video_object_layer_shape == '10') | | |
|     do { | | |
|       gray_shape_coding( ) | | |
|     } while (macroblock count != | | |
| total_macroblock_count | | |
|   } | | |
| } | | |

TABLE 2 intra_shape_coding( ) syntax

```
intra_shape_coding( ) {
        number_of_contours                              3 m, m>0   uimsbf
        initial_vertex_coding( )
        if (!hierarchical_vertex_
representation) {
                for (c=0; c < number_of_contours;
cc++) {
                        contour_type                    1–2        vlclbf
                        contour_coding_mode             2          uimsbf
                        if (contour_coding_mode == '00')
polygon_coding( )
                        else if (contour_coding_mode ==
'01') all_chain_coding( )
                        else if (contour_coding_mode ==
'10') boundary_chain_coding( )
                }
        }
        else {
                number_of_vertex_layers                 2          uimsbf
                for (h=0; h < number_of_vertex_
layers; h++) {
                        for (c=0; c < number_of_contours;
c++) {
                                hierarchical_intra_contour_
coding(h)
                        }
                }
        }
}
```

In the above tables, "saac" denotes syntax adaptive arithmetic coding, "bslbf" denotes binary string left bit first, "uimsbf" denotes unsigned inter most significant bit first, and "vlclbf" denotes variable length code left bit first.

The extended syntax is backward compatible with the non-hierarchical syntax of MPEG4-SCCE. If the hierarchical_vertex_representation flag is down, i.e., not equal to "1," then the syntax implements the non-hierarchical method.

Scalable Coding

The hierarchical vertex representation allows a decoder to reconstruct a contour at different accuracy by decoding parts of the bit stream which may be viewed as "accuracy scalability." A decoder may decide on the number of layers of vertices that needs to be used in the reconstruction of a contour to achieve a certain accuracy. For instance, for best possible representation using the least number of vertices, the decoder may choose to decode only the vertices at the base level, i.e., the most salient vertices. For higher accuracy, vertices belonging to less salient levels need to be decoded as well.

A decoder may make this decision in consideration of the available display resolution, for example. A relationship between the saliency parameter $D_{max}$ and the display resolution may be defined to implement spatially scalable shape coding. Because a high resolution display usually reveals more details of a shape, the decoder may decide to use more layers of vertices for such a device. To use more layers of vertices means to include layers of vertices associated with smaller $D_{max}$'s. Therefore, one may define the relationship between the saliency parameter $D_{max}$ and the display resolution such that, as the resolution increases, lower values of $D_{max}$ are required in order to include more layers of vertices.

In a spatially-scalable coding application, the decoder reconstructs a spatially lower resolution of the video objects, and hence a spatially lower resolution of the video images. In other words, the texture and shape is reconstructed at a lower spatial resolution. In a spatially-scalable coding, the decoder may use the base layer vertices in reconstructing the object shape at lowest spatial resolution; the coordinates of the vertices are scaled down by M, where M denotes the factor of spatial resolution reduction in both horizontal and vertical dimensions. For instance, M can be 2, 4, or any integer.

Quality scalability is also referred to as "accuracy scalability." Spatial scalability is tied to the $D_{max}$ parameter, which is a more general statement of the method.

Content-scalable shape coding is achieved by representing important parts of the contour by a greater number of layers. Important parts of the contour are those parts that surround important parts of the objects, such as the face of a human subject.

As used in this application, the term "set" may refer to the null set or a set having only one element as well as to a set having a plurality of elements.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for identifying a match for a target digital image from among a set of candidate digital images, comprising:

(a) identifying at least one candidate salient point set from at least one of said candidate digital images;

(b) identifying a target salient point set from said target digital image;

(c) comparing said at least one candidate salient point set to said target salient point set;

(d) for each said at least one said candidate digital image marking said candidate digital image for further inspection if said candidate salient point set meets a similarity threshold with said target salient point set;

(e) identifying another target salient point set from said target digital image;

(f) for each said candidate digital image marked for further inspection identifying another candidate salient point set; and (g) if said database image has been marked for further inspection, comparing said another target salient poiint set with said another candidate salient point set and marking said candidate image for yet further inspection if said another candidate salient point set meets a similarity threshold with said another target salient point set.

2. The method of claim 1 in which the steps of identifying said candidate salient point sets and said another candidate salient point sets are performed prior to any of the other steps.

* * * * *

UNITED STATES PATENT AND TRADEMARK OFFICE
CERTIFICATE OF CORRECTION

PATENT NO. : 6,925,207 B1  
APPLICATION NO. : 09/535436  
DATED : August 2, 2005  
INVENTOR(S) : Sezan et al.

Page 1 of 1

It is certified that error appears in the above-identified patent and that said Letters Patent is hereby corrected as shown below:

Col. 4, lines 7–8  
Change "An hierarchy" to --A hierarchy--.

Col. 4, lines 65–66  
Change "multiple set" to --multiple sets--.

Col. 5, lines 1–2  
Change "by larger number" to --by a larger number--.

Col. 6, line 52  
Change "quantitize" to --quantize--.

Col. 6, line 55  
Change "quantitizer" to --quantizer--.

Col. 10, line 53  
Change "poiint" to --point--.

Signed and Sealed this

Third Day of June, 2008

JON W. DUDAS  
*Director of the United States Patent and Trademark Office*